Sept. 25, 1945.  G. L. POWNALL  2,385,539
AUTOMATIC ICE FREEZING UNIT AND METHOD
Filed Oct. 20, 1941  3 Sheets-Sheet 1
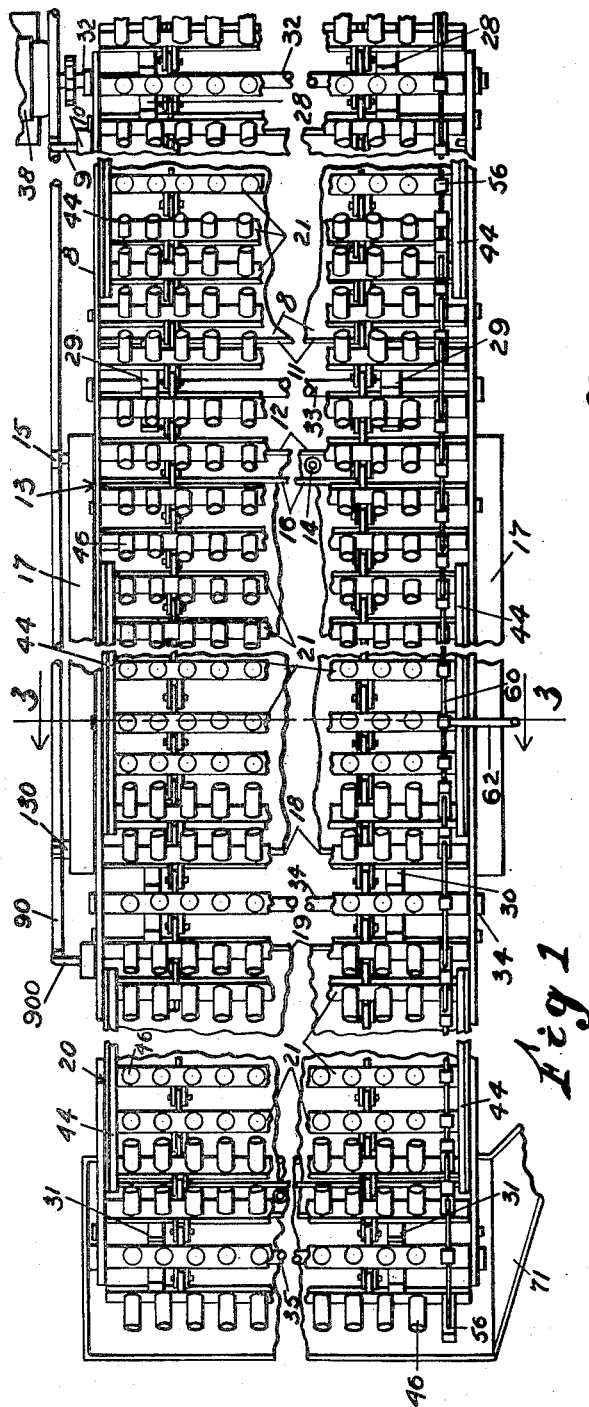
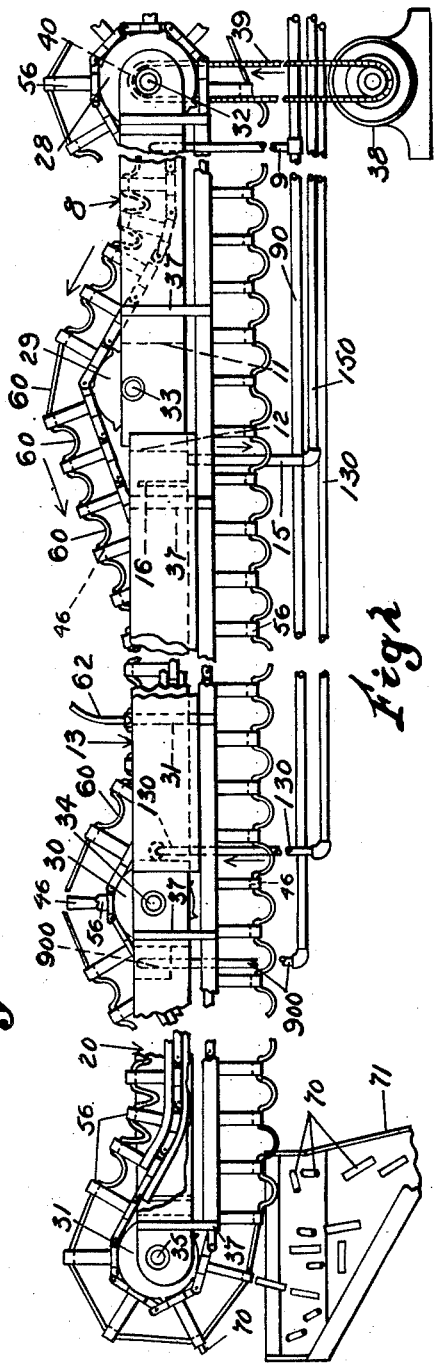
INVENTOR.
George L. Pownall.
BY Murray, Sachhoff & Paddach
ATT'ys.

Sept. 25, 1945.                G. L. POWNALL                    2,385,539
                    AUTOMATIC ICE FREEZING UNIT AND METHOD
                    Filed Oct. 20, 1941            3 Sheets-Sheet 2
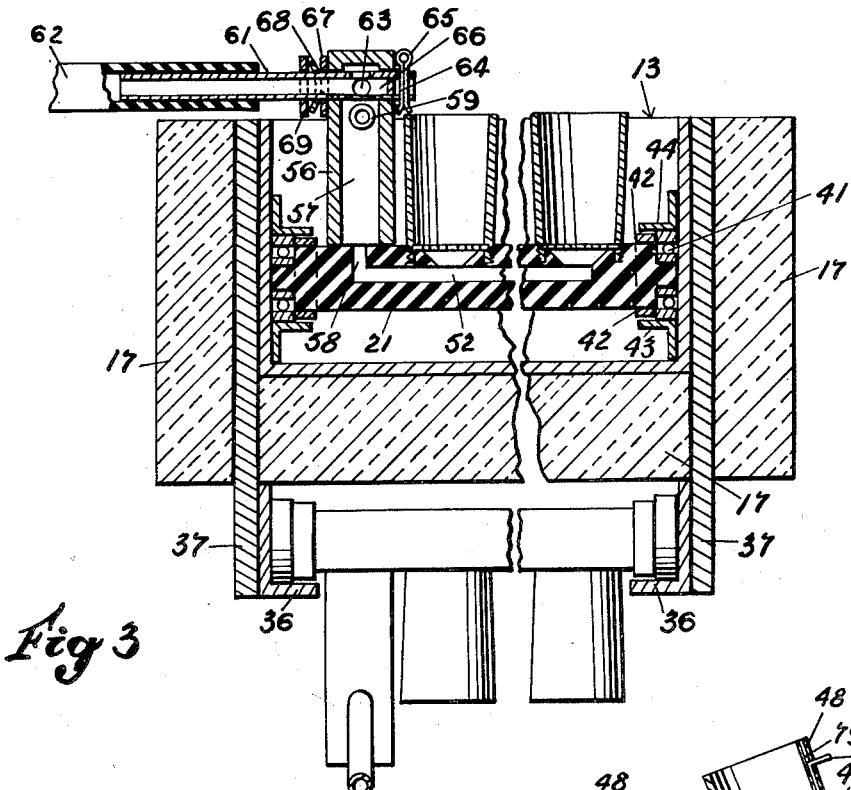
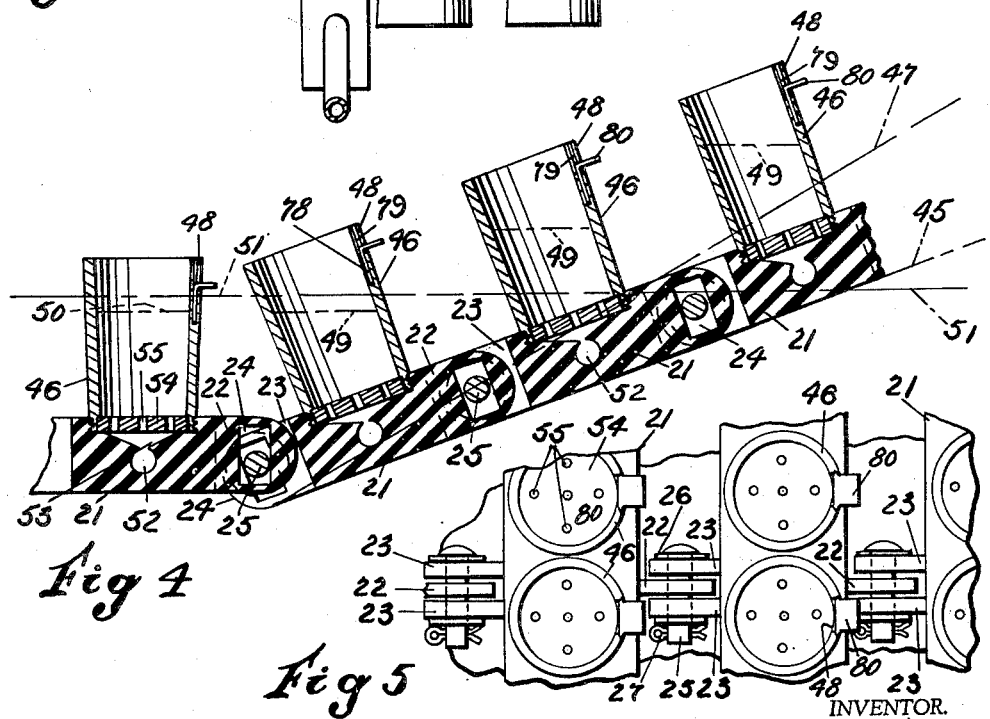
INVENTOR.
George L. Pownall.
BY Murray, Sachhoff & Paddack
ATT'YS.

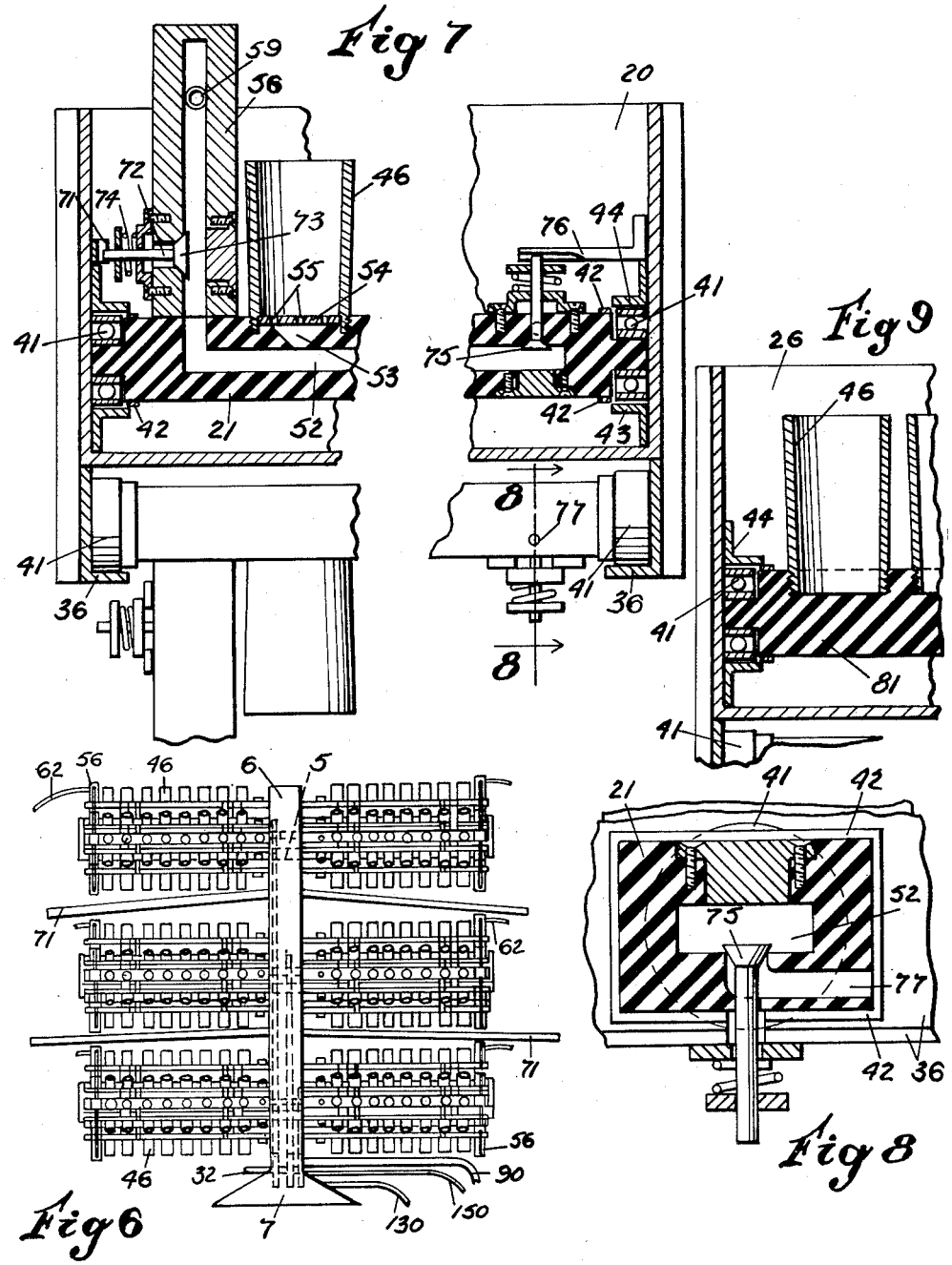

Patented Sept. 25, 1945

2,385,539

UNITED STATES PATENT OFFICE 2,385,539

AUTOMATIC ICE FREEZING UNIT AND METHOD

George L. Pownall, Columbus, Ohio

Application October 20, 1941, Serial No. 415,740

23 Claims. (Cl. 62—105)

The present invention relates to ice manufacturing and has for an object the provision of a mechanical unit and a method for automatically producing and harvesting small clear ice portions economically and continuously without further processing for table use.

Another object of the invention is to provide small ice portions of small diameter for use in lieu of crushed ice produced by other methods and thus eliminate the ice-crushing operation.

Another object of the invention is to provide a device wherein water-containing ice mold members are moved through a freezing brine while distilled water in the molds is frozen into clear ice or raw water in such molds if frozen into opaque ice.

A further object of the invention is to provide a device of this kind wherein water-containing ice mold members are moved through an efficient freezing brine tank while the water to be frozen is agitated.

Another object is to provide a device of the character indicated wherein the molds are arranged to regulate the height of the water therein.

Still another object of the invention is to provide compact units of the character indicated which may be used in multiples, arranged in tiers so that valuable floor space is conserved.

These and other valuable objects are attained by the means described herein and exemplified in the accompanying drawings, in which:

Fig. 1 is a top plan view of an automatic ice freezing unit of the invention, parts being broken away.

Fig. 2 is a side elevational view of the device of Fig. 1, parts being broken away.

Fig. 3 is an enlarged scale cross-sectional view taken on line 3—3 of Fig. 1, part being broken away.

Fig. 4 is a cross-sectional view showing a series of mold carrying members, one of which is shown in freezing position, the remainder being shown inclined for entry into the freezing brine, the level of water in the mold, and of the brine being indicated diagrammatically, and the angle of exit of the molds from the fresh water supply tank plotted for comparison against the angle of entry of the molds into the brine, said molds showing the water level regulators.

Fig. 5 is a fragmental plan view of the mold members and their linked connection.

Fig. 6 is a front elevational view disclosing a typical assembly of a plurality of units of the invention.

Fig. 7 is a longitudinal sectional view of a mold member of the invention embodying certain refinements that are optional in use.

Fig. 8 is a cross-sectional view taken on line 8—8 of Fig. 7.

Fig. 9 is a fragmental vertical sectional view through a simplified form of mold carrying member.

Heretofore the production of small ice portions has been proposed by various means which have been either too costly or otherwise unsuited for the production of this form of ice on a large quantity scale.

According to the present invention water filled moving molds are passed through a body of freezing brine while the water in each mold is undergoing agitation in order to produce clear transparent ice portions. In its simpler embodiment the device may be used to freeze distilled water, raw water or other freezable substance. The travel of the molds is through an endless circuit in which the empty molds are filled to a predetermined limit by suitable means, and pass thence into and horizontally through the freezing brine and finally through a thawing station, after which the ice portions are automatically discharged.

The units of the invention are adapted for mounting on suitable supports, not detailed, but which may be in the form of horizontal arms 5 of structural steel, extending from vertical standards 6 or, if desired, the arms may project from the wall of a room in any suitable manner (not shown). As shown in Fig. 6 the standards 6 on suitable bases 7 have the horizontal arms extending from each side of the standards and the units of the invention are arranged in pairs on each level. This affords a very compact multiple unit construction that may be built to include up to ten units in paired relation (five units high) and still be disposable within ordinary room height. Such a multiple unit would have a production capacity of about 25 tons of small ice portions per day and could be shipped in assembled form on an ordinary railroad flat freight car if desired. The main brine storage tank, power equipment and pumps (not shown) are disposed beneath the device of the invention.

The present invention eliminates much of the cost of producing small ice portions as entailed by the present day commercial methods of freezing large blocks of ice and reducing them to desired particle size by wasteful sawing and crushing machine methods. It will be seen that mobile ice plants of large capacity are entirely feasible by the use of my invention since there has been eliminated the usual large ice freezing tank with its usual large floor space together with all such equipment as cranes, dip tanks, ice dumps, can fillers, large ice cans, the usual wooden frame work, and tank covers, core sucking equipment and ice chutes. At the same time the labor of harvesting large ice blocks and of reducing them to small size portions is eliminated along with the hazards to workmen. All operations are automatic and continuous.

Referring now to the drawings and particularly to Figs. 1 and 2, each unit of the invention comprises three shallow tanks in longitudinal alignment. These are shown with parts broken away. At the right hand end of Fig. 2 is a relatively short fresh water supply tank 8 to which water is supplied to a predetermined constant level through a pipe 9 which is fed by a supply line 90. A conventional float controlled valve 10 (not detailed) is employed to maintain the water level in tank 8.

Spaced from the end wall 11 of tank 8 is the end wall 12 of a tank 13 for containing a circulating body of freezing brine. An outlet 14 in the bottom of the brine tank 13 close to its end wall 12 connects with outlet pipe 15 which extends horizontally to the exterior wall and then downwardly for connection with a brine return pipe 150 which leads to a brine storage tank (not shown). An overflow baffle 16 in the tank 13 serves to maintain the desired level of the brine and is located closely adjacent the outlet 14. As illustrated in Fig. 3, the walls and bottom of tank 13 are exteriorly covered with heavy insulating material 17. The remaining end wall 18 of tank 13 is spaced from the proximate end wall 19 of a warm water tank 20 which is shorter than the tank 13. This tank is supplied with water from pipe 90 by a float valve controlled pipe 900. A brine supply pipe 130 feeds the cold brine from a pump (not shown) to tank 13.

Through the aforementioned tanks 8, 13 and 20 a series of mold carrying cross members 21 is caused to travel successively. Members 21 are arranged for conveyor type movement and are disposed as an endless chain, the respective members having fixed single lugs 22 extending from one side near each end, while on the other side there are spaced pairs of lugs 23 which are longitudinally offset with respect to the lugs 22 so as to receive between them the lugs 22 of the adjacent cross member in the chain. The lugs 22 and 23 have slots 24 therein wherein a transverse pin 25 is loosely received. Washers 26 are interposed between the head of connecting pin 25 and the adjacent lug 23, and between a cotter pin 27, in the other end of the connecting pin, and the remaining lug 23. With this construction the caterpillar chain of cross members is enabled to move into and out of the several tanks. The upper reach of the caterpillar chain is supported on pairs of sprockets 28, 29, 30 and 31 on shafts 32, 33, 34 and 35 respectively. The shafts 32 and 35 are journalled just beyond the ends of tanks 8 and 20 respectively. The shaft 33 is journalled intermediate tanks 8 and 13 and shaft 34 is journalled intermediate tanks 13 and 20. The lower reach of the caterpillar chain is guided for sliding movement on tracks 36 which may be metal angle strips supported at intervals on hanger strips 37 secured in any suitable manner to the several tanks. The motive power for the device may be derived from any suitable source, for example as shown, an electric motor 38 may have a drive chain 39 passing about a drive sprocket 40 on the shaft 32.

As shown in Figs. 3 and 7, the members 21 may be provided with suitable rollers 41 at the opposite ends and with fixed guide wings 42 on members 21 alongside the rollers to hold said cross members against tilting when passing through horizontal guides constituted by spaced angle members 43 and 44. The angle members are arranged intermediate the ends of the several tanks at a level which fixes the depth to which cross members 21 are submerged in their travel through the respective tanks.

From the foregoing and with reference to Figs. 1, 2 and 4, it will be noted that the mold carrying cross members 21 are moved along by the sprockets 28 and are guided into and out of the several tanks by said sprockets 28 and sprockets 29, 30 and 31 at selected angles of incline that are governed by the location of the tops of said sprockets relative to the nearest ends of the guiding angle members 44 beneath which the caterpillar chain passes.

Fig. 4 shows one of the mold carrying cross members 21 in a horizontal position, as when traveling beneath a guide 44 in a tank and a succession of other cross members 21 at an angle of twenty degrees (20°) thereto. The angle is indicated also by the dashed line 45 and shows diagrammatically the angle at which the fresh water containing molds 46 are entered into the brine tank 13. The dashed line 47 indicates diagrammatically (without regard to direction) the relatively steeper angle of thirty degrees (30°) at which said molds left the fresh water tank 8. The molds 46 are thus filled with water in tank 8 and are tipped at an angle of 30° (as actually shown in Fig. 2) when they travel upward over sprocket 29 thus assuring a definite water level in each mold. In order that the molds 46 may be accurately charged with fresh water in tank 8 and shall thereafter neither spill any of this water in the brine tank nor be contaminated with the brine, I prefer to make the molds taller than the proposed height of the ice portion to be frozen therein. A slot 48 is cut at the top of each mold on the trailing side thereof, said slot assuring that the fresh water level in the mold shall be below the brine level in the brine tank when the mold has advanced into the latter tank. There is therefore a maximum freezing, and the expansion of the ice at the critical time is still below the top level of the brine outside the mold. The slot 48 terminates at a safe margin of distance above the brine level during passage of the mold through the brine tank. I have indicated diagrammatically in Fig. 4 the various liquid levels and the ice level in the following manner. Line 49 indicates the fresh water level in the several molds. Line 50 indicates the ice level. Line 51 indicates the brine level in the brine tank 13.

The structure of the mold carrying cross members 21 is such as to afford passage therethrough of a fluid medium without danger of freezing while the water carrying molds 46 pass through the freezing brine in tank 13 to produce the ice portions in molds 46. To this end I may employ hard rubber or some suitable insulating plastic within which is a passage 52 opening at intervals into wells 53 in the top face of member 21. The molds 46 are threaded into the wells 53. The body of the mold is of good heat conducting material, e. g., aluminum, while the bottom 54, which has perforations 55 therein, is desirably of plastic material with a waxed finish in order to prevent the ice portions from freezing solidly thereto, and to prevent formation of ice in the perforations 55 through which the agitating fluid escapes into the molds. The construction of the cross members may be modified in various ways without impairing its functions or its efficiency. For example, as will be readily understood without further illustration, the same results may be attained by making member 21 a metal shell filled with asphaltic insulation and the ends of such metal shell may slide in the guides with or without the aid of the rollers 41.

Near one end of each member 21 is a riser 56 which is considerably higher than the molds 46 with which it is aligned. Each riser 56 has a vertical passage 57 which communicates with the center horizontal passage 52 in the riser through the bore 58. Near the top of each riser, that is to say, above the top level of the molds, are protruding nipples 59 which are aligned on adjacent sides of adjacent risers when the cross members are in parallel relation. Flexible hose members 60 connect adjacent nipples of adjacent risers and these hose members are long enough to permit angular divergence of the risers as successive cross members 21 are moved about the circumference of the several sprockets 28, 29, 30 and 31.

At one or more intervals in the caterpillar chain or conveyor belt structure an air feed connection is provided to a riser 56. As shown in Fig. 3 a hollow member 61 has a hose 62 connected to one end thereof while the other end passes through the riser 56 with a close fit which will permit turning of member 61 in the said riser. Holes 63 in member 61 serve to establish communication between the inside of the hose and the interior of the riser. An external sealing washer 64 abuts the one side of the riser and the free end of member 61 passes through it and is held against removal by a cotter pin 65 or any other suitable means. A suitable plug or closure 66 is disposed within member 60 near or at its free end. On the opposite side of the riser a sealing washer 67, a spring washer 68 and a nut 69 are mounted, in the order named, on member 61 to provide a fluidtight swivel connection. The hose 62 is in this instance connected with a pressure air supply source (not shown) and its length is such that, as the riser travels during movement of the chain, the hose travels with it and will not be twisted because of the swivel connection of the hollow member 61.

From the foregoing it will be noted that the molds on the cross members are submerged in fresh water in tank 8. As they leave tank 8 on the steeper (30°) incline the excess fresh water is spilled back into tank 8. The molds tilt in the opposite direction (away from the slots 48) and as they pass over sprocket 29 they are entered into the brine tank 13 at a lesser angle of 20°. The guide members 43 and 44 cause the water carrying molds to travel horizontally through the brine during freezing of the water. Air under pressure is supplied constantly through hose 62 to the riser with which it is directly connected and from thence to the other risers by way of the flexible connections 60. The air thus establishes a pressure head in each of the hollow cross members 21 and part of it is constantly escaping through the restricted perforations 55 in the bottoms of those molds that are empty or which contain water which is kept in constant agitation until the water freezes solidly as clear transparent ice. Any impurities in the water are driven to the tops of the molds by this agitation during freezing and they are washed away in the thawing water tank 20. When the cross members 21 ride up over sprockets 31 the ice portions 70 drop into a collecting chute 71.

The empty molds continue to move in inverted position over the member 36, entirely along the length of the bottom of the several tanks until they again are carried around the sprockets 28. During this interval the hollow passageways in the cross members are cleared of any condensed moisture that may have accumulated therein.

In order to assure separation of the ice portions 70 from the bottom of the molds there is provided the arrangement illustrated in Fig. 7. This arrangement is optional and is not elsewhere illustrated in the drawings. The arrangement consists of providing in each riser 56 and in the remote end of the cross member 21 a pair of spring closed valves which are closed except during passage of the parts through the thawing water tank 20. One wall of this tank has, on the side, nearest the risers 56, a cam track 71 which is disposed on the level of plunger 72 carrying valve 73 which opens inside the riser. A spring 74 holds the valve closed until the end of plunger 72 rides up onto the cam track and unseats it. Then the passage of pressure air which was stopped by the complete freezing of water in the molds serves to induce circulation of the thawing water from the tank 20. This water, being much warmer than the bottom of the mold in well 53, will thaw any ice bond that may exist at that location. A valve 75, arranged similarly to valve 73 but in the top of cross member 21, is opened by cooperating cam track 76, and controls discharge passage 77 for venting water and air passing through the cross member during this time. These valves close when their plungers ride off of their respective cam tracks, whereupon the air pressure alone passes through the cross members. During return travel of the cross members and their molds any thawing water is thoroughly expelled and the passages are completely dried by the pressure air movement before the cross members and their molds again pass around sprockets 28 and into fresh water supply tank 8 where they are submerged.

The operation of the device will be readily understood from the preceding explanation. After allowing the several tanks to fill to their predetermined level, motor 38 may be started, after which each cross member carries its group of molds through the successive tanks during an interval of time. The pressure air flows constantly in each cross member until the water in the molds is frozen solid as transparent ice portions. When the auxiliary thawing means of Fig. 7 is used the air pressure induces a circulation of the warm water through the air passages at the time the submerged valves 73 and 75 are open in the thawing tank and the molds are solidly frozen. When the auxiliary thawing means, comprising the valves 73 and 75, is omitted, the wax finish on the inside bottoms of the molds is relied upon to prevent the ice portions from adhering solidly at the bottom.

On passing through tank 20 the ice portions 70 are released from their molds and slide out of said molds as the latter are inverted in passing about the sprockets 35. The ice portions 70 may be of any desired cross section although I prefer the cylindrical or substantially cylindrical shape be employed for the reasons set forth in my U. S.

Patent 1,996,050, issued March 26, 1935, and also because the construction and assembly of the molds in the present device are simplified by that particular selection.

As a means for effecting a limited selective adjustment of the height of the water level in the molds 46 (see Figs. 4 and 5) a simple taper-edged metal strip 78 is made to slide vertically in grooves 79 in the opposed edges of the slots 49 in the walls of the said molds. Each strip 78 has an outwardly turned fingerpiece 80 whereby the adjustments are made. By this means the weight of the individual small ice portions is ultimately regulated so that the total weight output of ice of one of the automatic ice freezing units per unit of time when operating under predetermined conditions is rather accurately calculable.

The unit of the invention may be constructed less expensively, if the production of clear transparent ice from raw water is not required, by eliminating the pressure agitating means, and by making cross members 81 (see Fig. 9) solid or uncored, and without the risers. The structure of the remainder of the unit is otherwise similar to that previously described and will be readily understood.

Various modifications may be made in the structural arrangements all within the spirit of the invention. The shallow brine tank is economical to operate, due in part to the relatively small volume of freezing brine, and further due in part to the arrangement whereby the direction of movement of the molds through the brine tank is opposed to the direction of the flow of the circulating brine. It is to be understood that the diameter of the molds used will be selected to provide the desired size of ice portions for various uses. If ice rods of very small diameter for use in lieu of crushed ice are to be made by the unit of the invention, the number of molds per cross member would be greatly increased and the machine would be operated at increased speed.

What is claimed is:

1. In an automatic ice making unit, the combination of a brine tank for containing a circulating body of freezing brine, a thawing water tank adjacent said brine tank, an endless chain of linkage connected cross members arranged for travel through said tanks, a series of open topped molds on each cross member, said molds adapted to contain water at a predetermined level below the tops thereof, said cross members each having a pressure fluid passage therein communicating with the bottom interior of each of the molds thereon and arranged in heat insulated relation to the outside of the cross member, means for supplying fluid under pressure to the passages whereby water to be frozen in the molds may be agitated, means comprising sprockets for moving the chain into and out of said tanks, and guide means for constraining the travel of the chain to a predetermined level in the brine tank such that the water level in the molds is below the level of the brine in the brine tank.

2. In an automatic ice making unit, the combination of a brine tank for containing a circulating body of freezing brine, a fresh water tank and a thawing water tank at opposite ends of said brine tank, an endless chain of mold carrying cross members for movement into and out of each of said tanks in succession, a set of means arranged for tractionally supporting portions of said chain above the ends of the respective tanks, guide means in the fresh water tank and engaging said chain whereby the molds on the cross members are submerged and filled with fresh water and upon leaving the fresh water tank and passing over the nearest tractionally supporting means are tilted to partially empty each mold to a uniform partly filled condition, guide means in the brine tank so related to said tractionally supporting means as to lead said partly filled molds into the brine tank at a lesser degree of inclination, and to thereafter retain the chain in submerged condition for horizontal travel through said brine tank, means establishing a constant brine level in said tank below the tops of the molds therein and above the level of the water in the molds, and means providing a flow of air under pressure through each of the cross members and upwardly through the molds thereon for agitating the water during freezing in passage of the chain through said brine tank, another of said tractional support means constraining said chain to move out of the brine tank and through the thawing water tank and over the endmost tractional support whereby the molds are inverted for discharging the ice portions from the molds.

3. In an automatic ice freezing unit the combination of a cross member having an interior passage therein in heat insulated relation to the exterior of said cross member, a series of open topped metallic molds on said cross member each having restricted communication at the bottom thereof with said passage, adjustable means on each mold to selectively adjust the water capacity thereof and a fluid pressure supply riser connected to the cross member adjacent an end thereof in fluid communication with the passage and extending above the tops of the molds.

4. In an automatic ice freezing unit, the combination of an endless chain conveyor comprising parallel, linkage connected, mold carrying cross members, each cross member having a longitudinal interior passage in insulated relation to the exterior of said cross member, a plurality of molds supported on the top face of each cross member with the bottoms insulated thereby and having restricted communication at their bottoms with said passage, hollow risers on said cross members communicating with said passages, flexible connectors establishing communication between the interiors of successive risers, and a flexible member for supplying fluid under pressure connected to one of said risers whereby all of the molds may receive agitating pressure fluid supply at the bottoms thereof.

5. In a device of the class described, a member comprising heat insulating material having a passage therein, metallic molds having their respective sidewalls non-tangent with adjacent molds and individually bottomed on said member and having restricted perforations in the bottoms communicating with said passage, the bottoms of the molds being thereby insulated against freezing of the contents thereof from the bottom upwardly and means comprising a riser extending above the tops of the molds for directing fluid under pressure through said passage and upwardly through the molds.

6. In an automatic ice freezing unit the combination of a plurality of individual ice molds, means supporting said molds and insulating the bottoms thereof and having a passage connecting with the respective molds at the bottoms thereof, means for supplying fluid under constant pressure to said passage, a constant level brine tank, means to move said support means and guide members retaining the support means and the molds carried by it in predetermined relation to the brine level during movement of said supporting means and molds through said tank.

7. In a device of the class described, a constant level fresh water tank, a brine tank comprising an overflow baffle and a source of circulating brine supply, an endless chain conveyor comprising mold carrying cross members, pairs of sprockets tractionally supporting said chain for movement into and out of said tanks successively, means in the fresh water tank guiding said cross members from submerged condition in the fresh water tank onto an adjacent pair of sprockets at a predetermined angle whereby the molds are partly emptied of fresh water to establish uniform fresh water content in all the molds, and guide means in the brine tank and so related to the said pair of sprockets as to lead the mold carrying members into the brine tank at a lesser predetermined angle and then retain the cross members at a constant level in the brine such that the water level in the molds is lower than the level of the brine surrounding the molds and the tops of molds is above the brine level.

8. In an automatic ice freezing unit the combination of a brine tank arranged for controlled height of the brine therein, a plurality of molds movable therethrough with their tops above the said controlled height brine level, means automatically supplying and regulating a quantity of fresh water in each mold such that the water level in the mold is below the brine level in the tank as the mold moves through said brine tank, means providing constant agitation of the water in said molds, a thawing tank bath aligned with said brine tank for passage of said molds therethrough after leaving said brine tank, and tractionally supporting means for the molds arranged to invert the molds and automatically discharge ice therefrom as the molds leave said thawing tank bath.

9. Automatic ice freezing means comprising a tank for containing a circulating body of freezing brine, mold members movable therethrough, means to charge said molds with fresh water to a level such that, when the molds move through the tank, the water level in the molds is below the level of the brine, adjustable means on each mold member to selectively regulate the height of water therein and means to supply air under pressure to the bottom interior of the molds at all times.

10. Small ice portion production means comprising a hollow heat insulating carrying member, a cell-like mold of heat-conducting material secured thereon, a container for a freezing medium, means to move the carrying member in the container, and means to supply fluid agitating medium through the carrying member into the mold.

11. In an automatic ice making unit, the combination of a brine tank, a thawing water tank adjacent said brine tank, an endless chain of linkage connected hollow cross members arranged for travel through said tanks, a series of open topped molds on each cross member and insulated at the bottoms thereby, means comprising sprockets for moving the chain into and out of said tanks, and guide means for constraining the travel of the chain to a predetermined level in the brine tank such that the water level in the molds traveling therethrough is below the level of the brine in the brine tank.

12. In an automatic ice making unit the combination of a brine tank, a fresh water tank and a thawing water tank at opposite ends of said brine tank, an endless chain of mold carrying cross members for movement into and out of each of said tanks in succession, a set of means tractionally supporting portions of said chain above the ends of the respective tanks, guide means in the fresh water tank whereby the molds on the cross members are caused to fill with fresh water, said molds upon leaving the fresh water tank and passing over the nearest tractionally supporting means being tilted to partially empty the molds to a uniform partly filled condition, guide means in the brine tank so rated to the last mentioned tractionally supporting means as to lead the partly filled molds into the brine tank at a lesser degree of inclination, and to thereafter retain the chain in a submerged condition for horizontal travel through said brine tank, means effecting controlled height of the brine in the brine tank at a level below the tops of the molds and above the level of the water in the molds, another of said tractional support means constraining the chain to move out of the brine tank, thence through the thawing water and over the endmost tractional support whereby the entire chain and the molds thereon are inverted for discharging the ice portions from the molds.

13. The method of making small ice portions which comprises moving heat conducting molds through a freezing medium while protecting the bottoms of the molds against the freezing medium and then subjecting the molds including the bottoms to a thawing medium for a time sufficient for eliminating all ice bond between the frozen content of the mold and the mold itself.

14. The method of producing small ice portions which comprises moving cell-like heat conducting members on a cold insulating carrying member, through a freezing medium for a time sufficient to form independent ice portions in the molds and then supplying thawing water through the carrying member to the bottoms of the molds for a time sufficient to eliminate any possible ice bond.

15. The method of making small ice portions which comprises the steps of moving a group of cell-like molds into a fresh water tank for filling the molds, moving said molds out of the fresh water tank at an angle of inclination such that the molds are uniformly and partially filled with fresh water, then moving the molds at a lesser degree of inclination into an open topped liquid freezing tank and continuing the movement horizontally through the freezing medium so that the level of the freezing medium is below the tops of the molds and above the fresh water level in the molds.

16. In a device of the class described, a rigid member, a plurality of spaced apart molds fixed on the top face thereof, lugs projecting from opposite sides of the member in offset relation, and having transverse slots therethrough.

17. In an ice freezing unit, the combination of a member having a passage therein, a plurality of molds secured on the top face of the member and communicating at the bottoms with said passage and spring closed valves near the opposite ends of the member openable to effect communication between the passage and the outside of said member.

18. In an automatic small ice freezing device the combination of a movable mold carrying member, molds thereon, means to selectively vary the water capacity of each mold, means to fill the molds while in motion, and means to tilt the molds during continued motion to uniformly discharge excess liquid therefrom.

19. The method of making small ice portions which comprises supporting a plurality of water containing, heat conducting molds with the bottoms thereof on a heat insulating carrying member, moving said member through a height controlled liquid freezing medium in such relation that the molds are partially submerged and the level of the water in the molds is below the liquid level of the said freezing medium, whereby freezing of the water in the molds progresses in a direction from the outer sides of the molds toward the centers while freezing from the bottom of the mold upwardly is precluded by the insulating support member and finally removing the support member and ice filled molds from the freezing medium.

20. The method of making small ice portions which consists in moving a group of spaced apart open-topped molds on a common insulating support member through a water filling station, then tilting the molds to a predetermined angle whereby water in excess of a predetermined amount is discharged from each mold, then moving the molds through a freezing medium wherein the freezing of water in each mold progresses from the outer sides to the centers of the molds only, while the common insulating support member precludes freezing in an upwardly direction through the bottoms of said molds.

21. The method of producing a small ice portion of selected weight which comprises moving a heat-conducting cell-like mold through a water filling station, adjusting the amount of water therein by spilling excess water to attain a selected predetermined volume while the mold is moving, then continuing the movement of the mold and directing it through a freezing medium for a time sufficient to form the ice portion in the mold.

22. The method of making a small clear ice portion which comprises travelling a water filled heat-conducting cell-like mold through a freezing medium while insulating the bottom wall of the mold from said freezing medium and agitating the water at the bottom of the mold during travel thereof until clear ice is formed therein.

23. The method of producing a small ice mass which consists in filling a heat-conducting cell-like mold with water, tilting the mold to a predetermined angle to discharge excess water therefrom and then moving the mold while in an upright condition and in predetermined partially submerged condition through a height controlled body of circulating liquid freezing medium for a time sufficient to form a small ice mass within said cell-like mold.

GEORGE L. POWNALL.